(No Model.)
F. LAUTERMILCH.
SPLIT CHUCK FOR WATCH MAKERS' LATHES.
No. 406,356. Patented July 2, 1889.
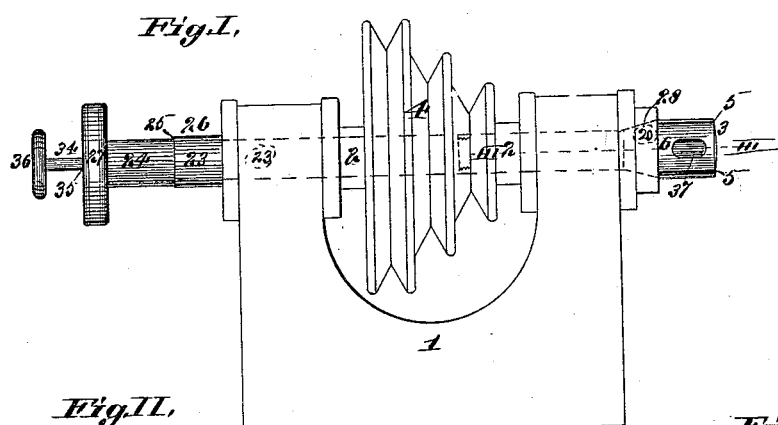
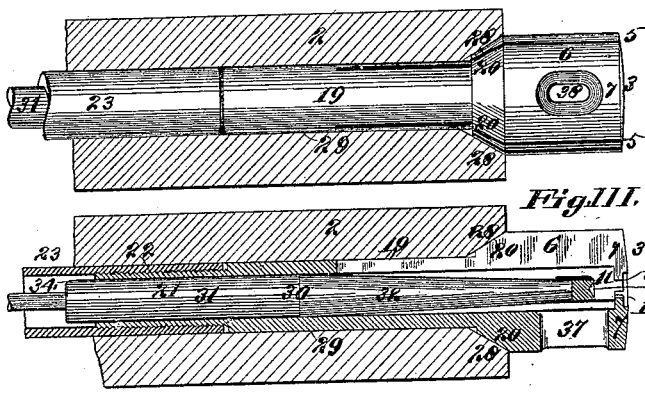 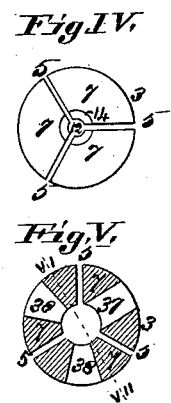
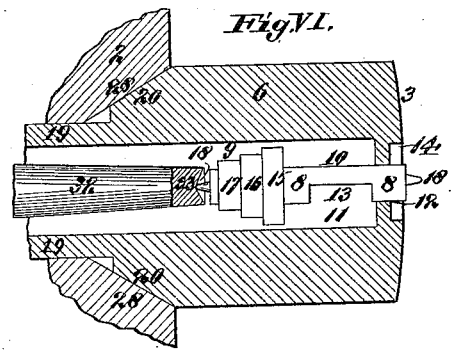 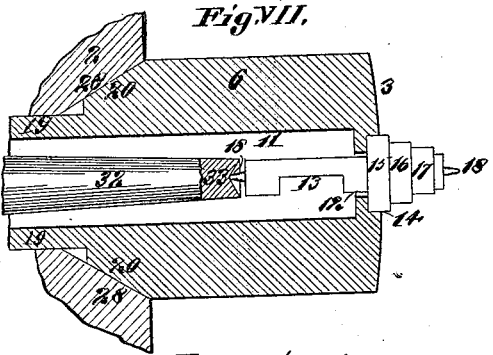
Attest:
G. N. Hinchman Jr.
E. Arthur
Inventor:
Frederick Lautermilch
By Knight Bro's
Atty's.

UNITED STATES PATENT OFFICE.

FREDERICK LAUTERMILCH, OF KIRKWOOD, MISSOURI, ASSIGNOR OF ONE-HALF TO EDWARD WILMAS, OF SAME PLACE.

SPLIT CHUCK FOR WATCH-MAKERS' LATHES.

SPECIFICATION forming part of Letters Patent No. 406,356, dated July 2, 1889.

Application filed March 19, 1889. Serial No. 303,834. (No model.)

*To all whom it may concern:*

Be it known that I, FREDERICK LAUTERMILCH, of Kirkwood, in the county of St. Louis and State of Missouri, have invented a certain new and useful Improvement in Split Chucks for Watch-Makers' Lathes, of which the following is a full, clear, and exact description, reference being had to the accompanying drawings, forming part of this specification.

This invention relates to a split chuck for a watch-maker's lathe attachment, provided with a lateral opening for the insertion of the cylinders of watches, &c., and spy-holes for observation during adjustment, with adjustable center-bearing core; and the invention consists in features of novelty hereinafter fully described, and pointed out in the claims.

Figure I is an elevation of the head-stock of a watch-maker's lathe, to the running spindle of which my split chuck is secured. Fig. II is an enlarged vertical section of the running spindle, and shows the split chuck seated therein. Fig. III is an enlarged longitudinal section taken on line III III, Fig. I, and shows the split chuck seated within the running spindle and the adjustable back-center core inserted within the chuck. Fig. IV is a front end view of the split chuck. Fig. V is a vertical section of the chuck across the line of insertion and spy-holes. Fig. VI is an enlarged longitudinal section taken on line VI VI, Fig. V, and shows the barrel end of the cylinder-spindle in position for truing; and Fig. VII is a like view with the step-cone end of the cylinder-spindle projected.

Referring to the drawings, 1 represents the head-stock of a watch-maker's lathe, in the running tubular spindle 2 of which my improved split chuck 3 is secured, and 4 are the series of cone-pulleys on said running spindle, in which the endless cords engage that drive the lathe.

The chuck, which is made of steel, brass, or any other suitable material, has a triple split 5 at its forward end through its head 6, and which extends sufficiently back along its stem to provide an elastic triple spring-jaw 7, that clutches, respectively, either the barrel 8 or the step-cone 9 of the watch-cylinder spindle 10 when said parts are adjusted for truing.

The split chuck is provided with a tubular chamber 11 inside along its whole length; but at the mouth of the jaws the said opening is reduced, so as to provide a smaller grip-hold 12 to said jaws to contract their clutch on the forward end in front of the cut-away 13 of the hollow cylinder, and, again, outside said reduced grip of the jaws is a countersink in the face or forward end of the split chuck, which forms a grip-seat 14 for use when it is desired to clutch the larger step 15 of the cone-pulley that is carried by the cylinder-spindle, which cone-pulley is also provided with steps 16 and 17 of varied diameter. Center points 18 at each end of the cylinder-spindle journal into the center bearings of said spindle in the running works of the watch to which it is to be attached.

The head of the split chuck is connected to the tubular stem 19 that carries it by the bevel shoulder 20, and the peripheral screw 21 on its diametrically-reduced inner end engages within the inner screw 22 of the rear extension tubular stem 23, integral with which is an enlarged extension 24, which is provided with a shoulder 25 at the junction of said parts 23 and 24, which shoulder engages against the rear extension of the rear journal 26 of the tubular running spindle 2, which journal and the forward journal of said spindle turn in their respective bearings in the head-stock. 27 represents a hand-wheel that is rigidly secured to or integral with the extension 24 of the stem 23, which carries the split chuck.

Now it will be seen by the above description that when the peripheral screw 21 of the tubular stem 19 of the split chuck is brought into engagement with the screw 22 of its tubular extension 23, by turning the hand-wheel 27 in the right direction, the chuck is drawn inward in its seat in the tubular running spindle 2, for as the shoulder 25 on the enlarged extension 24 of the stem prevents its longitudinal forward movement, consequently the split chuck on its longitudinally-movable end is drawn longitudinally inward in its seat within the said running spindle 2, and when the screw is sufficiently engaged the bevel-shoulder 20 at the rear of the chuck-head engages with the bevel-mouth 28 of the tubular opening 29 within the running spindle 2, the bevel surface of which, pressing on the bevel-shoulder 20 of the chuck-head, forces the spring-jaws of said split chuck together onto the watch-cylinder or step cone-pulley, as the case may be, so as to effect a secure hold.

30 represents the adjustable back center-core rod, which is constituted of the core-piece 31, having a bevel forward end 32, the extreme end of which is provided with a concave center bearing 33, in which the rear center point of the cylinder-spindle engages to hold it to the true while adjusting the said cylinder within the split chuck, and integral with said core is a rear extension-rod 34, that passes through the central perforation 35 in the hand-wheel 27, and said rod terminates in a hand-disk 36, by which the rod is easily adjusted longitudinally to bring its center bearing in position for holding the rear center point of the cylinder to its true position.

37 represents an opening through the periphery of the head of the split chuck into its tubular center, through which opening the said cylinder-spindle and the step cone-pulley mounted thereon are easily inserted and presented to their adjustment in the split chuck. 38 are spy-holes that also pass from the periphery of the head of the split chuck to its open tube-center, which spy-holes, as also the opening 37, enable the operator to watch the adjustment of the cylinder while bringing it to its true bearings, and also afterward, while operating on and truing up the cylinder, to observe any divergence (should there be any) from its true position.

Now it will be seen that for lack of the inserting-opening 37 I provide in the head of my split chuck it is found impossible in the common split chuck to grip the reverse end of the cylinder-barrel to that which carries the step cone-pulley, (as shown in Fig. VI,) for the reason that there is in them no means for the insertion of the step cone-pulley within the head of the split chuck. This is not as objectionable when truing up the step cone-pulley, the end of the cylinder that carries said pulley, and the center-bearing point that carries that end, as shown in Fig. VII, for the bare barrel of the cylinder enters freely through the open jaw 12, through which, however, the cone-pulley cannot pass, and there is not, as seen in Fig. VII, any great adverse projection or any weak point of the cylinder that is called upon to bear the strain between the part that is gripped and that which is being trued or operated on. This, however, is altogether changed when the other end of the cylinder is being trued. Then the whole length of the barrel of the cylinder, except the short nip adjacent to the cone-pulley, is projected from the face of the split chuck, and when the reverse end of the cylinder and its center-bearing point are being trued the adverse strain is very severe on the necessarily feeble portion of the cylinder where the cut-away 13 is located. While it is usual to strengthen said part with cement, that only in part obviates the difficulty, as is witnessed by the large percentage of cylinders that break at that point in the operation.

By the use of this device said breakage and frequent strainage of the cylinders are avoided and the difficult cleaning of the cylinders after the application of the gritty cement therein and thereto.

While this device is especially useful for truing up watch-cylinder spindles, the step cone-pulleys mounted thereon, and their center-bearing points, it may also be advantageously used for chucking other small and fragile objects in the process of truing up and finishing the same, in which the means it provides for the insertion of said object through the adjustment-hole 37 within the head of the split chuck and consequent rear presentation to the jaws of the chuck, instead of only a forward presentation, as at present, effect in most cases a much more effectual grip with less danger of injury to the fragile objects that are operated on.

It is to be understood that the back center-core rod need be only used while adjusting the position of the object to be operated on, so as to hold its rear center bearing in line with that to which it is to be trued, after which the said centering-rod may either be removed or allowed to remain, as desired, as the chuck is well able to hold the cylinder during the process of truing and burnishing. It will also be observed that by the use of my split chuck with the lateral opening for the insertion of the watch-cylinders, &c., when the cylinder, &c., is taken out on trial, the trial can be immediately effected without being detained to clean off the cement, which, as has been stated, my means for a rear insertion within the chuck-head provides means by which the necessity of the use of said cement is avoided; also, as is frequently the case, when the cylinder, &c., requires refitting, there is no delay, as in the usual process of cementing, by having to recement before its reinsertion in the chuck. In short, unlike in the usual cementing process, there is no delay in the frequently multitudinous trials that are necessary in fitting by having each time to stop to clean off and again recement.

I claim as my invention—

1. In a split chuck for watch-makers' lathes, a split chuck whose head is provided with a lateral opening into the tubular center of the chuck for the insertion of watch-cylinder spindles, and the step cone-pulleys mounted thereon, and other objects to be trued by the lathe when presented to the grip of the chuck, substantially as described, and for the purpose set forth.

2. In a split chuck for watch-makers' lathes, the combination of the split chuck provided with longitudinal slots between its jaws and having jaws closing toward its center grip, the head of said chuck being provided with a lateral opening into its tubular center for the insertion of watch-cylinders and other articles to be chucked, and the spy-holes 38 for the inspection of the object to be treated, substantially as described, and for the purpose set forth.

3. In a split chuck for watch-makers' lathes, the combination of the chuck-head and the stem that carries said head, the bevel-shoulder at the connection of the head to said stem, the said head and stem being provided with a tubular center and slotted longitudinal openings 5, that separate the jaws, the said head being also provided with an insertion-hole 37 from its periphery to its tubular center for the presentation and adjustment of the object to be operated on, which thus provides an approach to the jaws of the chuck from the inside, the spy-holes 37 in said head, the countersunk jaw-grip 14 in the face of the head, the extension-stem 23, with its enlarged end 24, the shoulder 25 of which works against the rear end of the tubular running spindle 2, the tube of which spindle is provided with a flaring mouth 28, with which the bevel-shoulder 20 of the split head engages when closing its grip, the junction-screws that connect the stems 23 and 19, the hand-wheel by which said stems and their junction-screws are operated to close and also to release the jaw of the chuck, and the back center-core rod 30, substantially as described, and for the purpose set forth.

FREDERICK LAUTERMILCH.

In presence of—
BENJN. A. KNIGHT,
SAML. KNIGHT.